(12) United States Patent
Que et al.

(10) Patent No.: US 10,684,502 B2
(45) Date of Patent: Jun. 16, 2020

(54) DISPLAY PANEL AND THE MANUFACTURING METHOD THEREOF, AND DISPLAY DEVICE

(71) Applicant: HUIZHOU CHINA STAR OPTOELECTRONICS TECHNOLOGY CO., LTD., Huizhou, Guangdong (CN)

(72) Inventors: Chengwen Que, Huizhou Guangdong (CN); Yong Fan, Huizhou Guangdong (CN)

(73) Assignee: HUIZHOU CHINA STAR OPTOELECTRONICS TECHNOLOGY CO., LTD., Huizhou (CN)

( * ) Notice: Subject to any disclaimer, the term of this patent is extended or adjusted under 35 U.S.C. 154(b) by 234 days.

(21) Appl. No.: 15/754,541

(22) PCT Filed: Jan. 17, 2018

(86) PCT No.: PCT/CN2018/073063
§ 371 (c)(1),
(2) Date: Feb. 22, 2018

(87) PCT Pub. No.: WO2019/127714
PCT Pub. Date: Jul. 4, 2019

(65) Prior Publication Data
US 2019/0384096 A1 Dec. 19, 2019

(30) Foreign Application Priority Data
Dec. 29, 2017 (CN) .......................... 2017 1 1483020

(51) Int. Cl.
*G02F 1/1335* (2006.01)

(52) U.S. Cl.
CPC .. *G02F 1/133512* (2013.01); *G02F 1/133514* (2013.01); *G02F 1/133528* (2013.01)

(58) Field of Classification Search
None
See application file for complete search history.

(56) References Cited

U.S. PATENT DOCUMENTS

2005/0157157 A1* 7/2005 Tsukamoto ......... H01L 27/3246
347/213
2014/0293160 A1* 10/2014 Tang ................... G02F 1/13338
349/12

(Continued)

FOREIGN PATENT DOCUMENTS

| CN | 103018989 A | 4/2013 |
|---|---|---|
| CN | 103218077 A | 7/2013 |

(Continued)

*Primary Examiner* — Richard H Kim
(74) *Attorney, Agent, or Firm* — Hemisphere Law, PLLC; Zhigang Ma

(57) ABSTRACT

Disclosed are a display panel and manufacturing method thereof and a display device. The display panel includes a first substrate, a second substrate, a chip on film, and a shading array layer. The end of the first substrate extending beyond the second substrate forms a bonding end and the chip on film is bonded onto inner side of the bonding end. The inner surface of the first substrate is provided with metal signal wires located in non-pixel area. The shading array layer is located in the non-pixel area and completely shades the wires. Because the first substrate faces the viewer and the chip on film is bonded onto the inner side of bonding end, a bezel-less design is attained. The patterned shading layer forms a pattern corresponding to the metal signal wires to shade the wires for weakening lights reaching the wires and reducing reflectiveness of wires.

9 Claims, 2 Drawing Sheets

(56) References Cited

U.S. PATENT DOCUMENTS

2016/0349565 A1   12/2016  Kim et al.
2018/0210286 A1*  7/2018  Hai .................. G02F 1/133528

FOREIGN PATENT DOCUMENTS

| CN | 105572998 A | 5/2016 |
| CN | 106646975 A | 5/2017 |
| CN | 106896557 A | 6/2017 |
| CN | 107045221 A | 8/2017 |
| CN | 107247360 A | 10/2017 |
| CN | 107479288 A | 12/2017 |
| CN | 107589579 A | 1/2018 |
| JP | H1152394 A | 2/1999 |

* cited by examiner

DISPLAY PANEL AND THE MANUFACTURING METHOD THEREOF, AND DISPLAY DEVICE

RELATED APPLICATIONS

The present application is a National Phase of International Application Number PCT/CN2018/073063, filed Jan. 17, 2018, and claims the priority of China Application No. 201711483020.9, filed Dec. 29, 2017.

FIELD OF THE DISCLOSURE

The disclosure relates to the field of display technology, and more particularly to a display panel and the manufacturing method thereof, and a display device.

BACKGROUND

With the flourishing development of liquid crystal display (LCD), LCD has become the mainstream of display due to a large number of advantages, such as thin profile, light weight, null radiation, and stable performance.

Typically, a bezel-less display does not mean a bezel-free display. The LCD panel of a display generally includes a color filter (CF) substrate and an array (a TFT array, that is, a thin-film transistor array) substrate. Liquid crystals are filled between these two substrates. For the overall design of a conventional bezel-less display, the CF substrate is configured to face outwards and the array substrate is configured to face inwards toward the backlight source. Thus, end users can only see the color filter substrate of the LCD panel with their bare eyes.

The LCD panel is disposed on the backplane. Due to the existence of the bonding area of the array substrate, the size of the array substrate of the LCD panel is larger than the size of the CF substrate, which would cause the bonding area of the array substrate to extend laterally and go beyond the boundary. Thus, a bezel is needed to shade the outreached bonding area so as to prevent the visuality of the LCD panel from being affected. So, it is hard to implement a real bezel-less display.

SUMMARY

In view of the deficiencies existed in the prior art, the invention provides a display panel and the manufacturing method thereof and a display device incorporating same for achieving a LCD panel with an extremely narrow bezel or a bezel-less LCD panel.

To this end, the invention proposes the following technological scheme:

The invention provides a display panel, which includes a first substrate, a second substrate, a chip on film, and a shading array layer. The first substrate is opposite to and space from the second substrate. The end of the first substrate extending beyond the second substrate forms a bonding end. The chip on film is bonded onto a surface of the bonding end facing the second substrate. The first substrate is closer to a light output surface than the second substrate is. The inner surface of the first substrate is provided with metal signal wires located in non-pixel area. The shading array layer is located in the non-pixel area and completely shades the metal signal wires.

In accordance with an embodiment of the invention, the inner surface of the second substrate is provided with color resistances formed in the pixel area and black matrices formed in the non-pixel area. The combinative projection of the black matrices on the second substrate is located in the non-pixel area and completely covers non-pixel area.

In accordance with an embodiment of the invention, each black matrix is filled in the gap between each adjacent color resistance.

In accordance with an embodiment of the invention, the black matrices are partially overlapped with the projection of the shading array layer on the first substrate.

In accordance with an embodiment of the invention, the thickness of the portion of the black matrix shaded by the shading array layer is smaller than the thickness of the rest of the black matrix.

In accordance with an embodiment of the invention, the thickness of the black matrices is smaller than the thickness of the color resistance.

In accordance with an embodiment of the invention, the hollowed-out area of the shading array layer is filled with a transparent material.

In accordance with an embodiment of the invention, the shading array layer is photoresist.

Another object of the invention is to provide a manufacturing for a display panel, which includes the steps of:

providing a liquid crystal cell, which includes a first substrate, a second substrate, and liquid crystals filled therebetween;

fabricating a shading film layer on a surface of the first substrate away from the second substrate;

exposing the shading array layer by a lithography mask;

etching off the exposed portion of the shading film layer so as to form a patterned shading array layer aligning with metal signal wires on the first substrate;

Respectively adhering an upper polarizer and a lower polarizer to the outer surface of the shading film layer and the outer surface of the second substrate.

Another yet object of the invention is to provide a display device, which includes a backlight module and a display panel as stated above, in which the backlight module is disposed at the side of the second substrate.

The first substrate of the invention faces the viewer, and the chip on film is bonded onto the inner side of the bonding end. Thus, a bezel-less architecture is achieved. By arranging a patterned shading array layer on the outer surface of the first substrate, the shading array layer forms a pattern corresponding to the metal signal wires on the inner surface of the first substrate, thereby providing shading for the metal signal wires. When an external light comes into the display panel, the incident light will be weakened or blocked by the shading array layer, so as to significantly suppress the intensity of the light reaching the metal signal wires. Thus, the reflectiveness of the metal signal wires is significantly reduced.

DETAILED DESCRIPTION OF PREFERRED EMBODIMENTS

Figure 1:
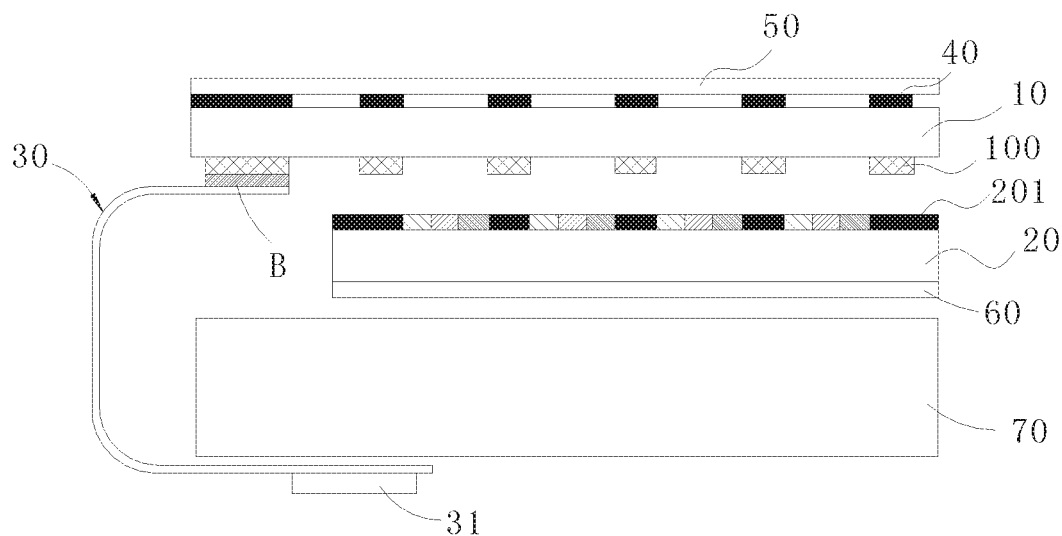
FIG. 1 is a schematic diagram showing the structure of the display device according to an embodiment of the invention.
Figure 2:
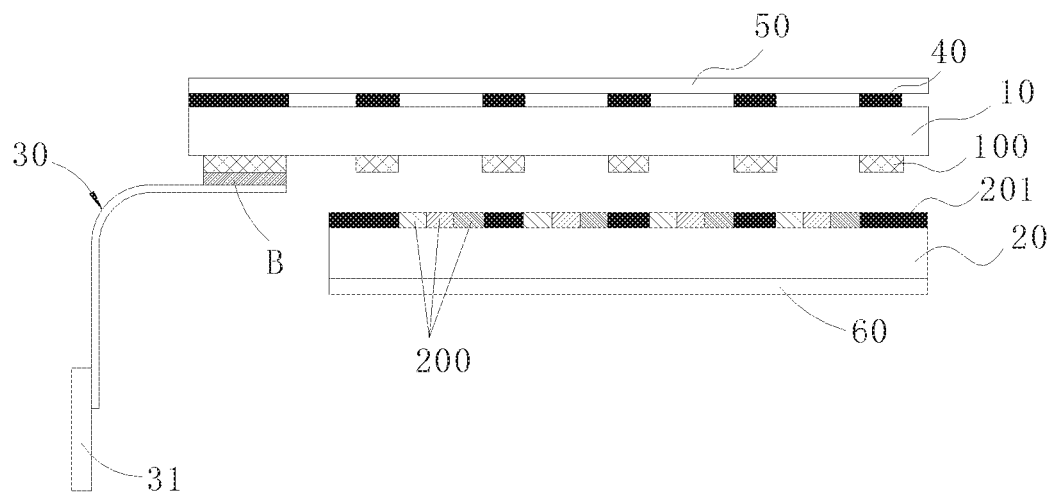
FIG. 2 is a schematic diagram showing the structure of the display panel according to an embodiment of the invention.

Please refer to FIG. 1 and FIG. 2, the display device according to an embodiment of the invention includes a backlight module 70 and a display module disposed above the backlight module 70. The display panel includes a first substrate 10, a second substrate 20, a chip on film 30, and a shading array layer 40. The first substrate 10 is opposite to and spaced from the second substrate 20. The end of the first substrate 10 extending beyond the second substrate 20 forms a bonding end. The chip on film 30 is bonded onto a surface of the bonding end facing the second substrate 20. The first substrate 10 is closer to the light output surface than the second substrate 20 is. That is, the first substrate 10 faces the viewer. The backlight module 70 is located at the side of the second substrate 20. The inner surface of the first substrate 10 is provided with metal signal wires 100 located in non-pixel area. The shading array layer 40 is located in non-pixel area and completely shades the metal signal wires 100.

Here, the first substrate 10 is a TFT substrate and the second substrate 20 is a color filter (CF) substrate. The projection of the metal signal wires 100 on the second substrate 20 is located in the gap between adjacent color resistance units 200. The inner surface of the second substrate 20 is provided with color resistances 200 formed in the pixel area and black matrices 201 formed in the non-pixel area. The combinative projection of the shading array layer 40 and black matrices 201 on the second substrate 20 is located in the non-pixel area and completely covers the non-pixel area. The combinative projection of the shading array layer 40 and black matrices 201 on the second substrate 20 is the combinative area covering the projection of these two elements on the second substrate 20.

Generally, each black matrix 201 is set to fill the gap between each adjacent color resistance 200. Nonetheless, in this embodiment the black matrices 201 may not overlap with the projection of the shading array layer 40 on the first substrate 10. That is, the portion of the black matrix 201 shaded by the shading array layer 40 can be omitted. Alternatively, the thickness of the portion of the black matrix shaded by the shading array layer 40 is smaller than the thickness of the rest of the black matrix 40. Because the metal signal wires 100 and the shading array layer 40 both can be used to block the optical crosstalk between the pixels, the thickness of the black matrix 201 can be set to be smaller than the thickness of the color resistance 200. Alternatively, the black matrix 201 can be omitted.

Besides, the display panel further includes an upper polarizer 50 and a lower polarizer 60 that are respectively adhered to the outer surface of a shading film layer 1 and the outer surface of the second substrate 20. The hollowed-out area of the shading array layer 40 can be filled with a transparent material to allow the shading array layer 40 and the transparent material to form an even surface for the upper polarizer 50 to be adequately adhered thereto. The shading array layer 40 consists of an optical adhesive or an overcoat layer. The chip on film 30 is adhered to the metal signal wires 100 through an anisotropic conductive film B, in which one end of the chip on film 30 may be bonded onto a printed circuit board (PCB) 31. In an alternative embodiment, the shading array layer 40 is photoresist.

Figure 3:
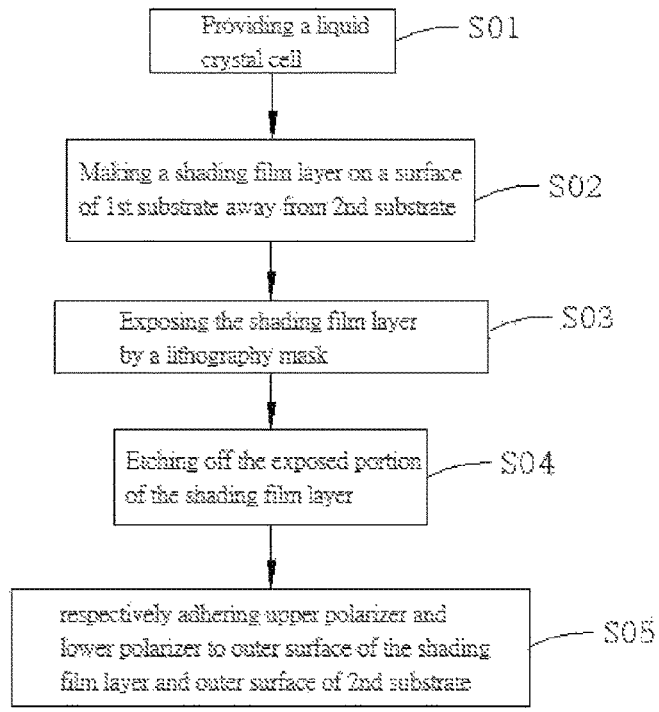
FIG. 3 is a flow chart illustrating the manufacturing process of the display panel according to an embodiment of the invention.
Figure 4:
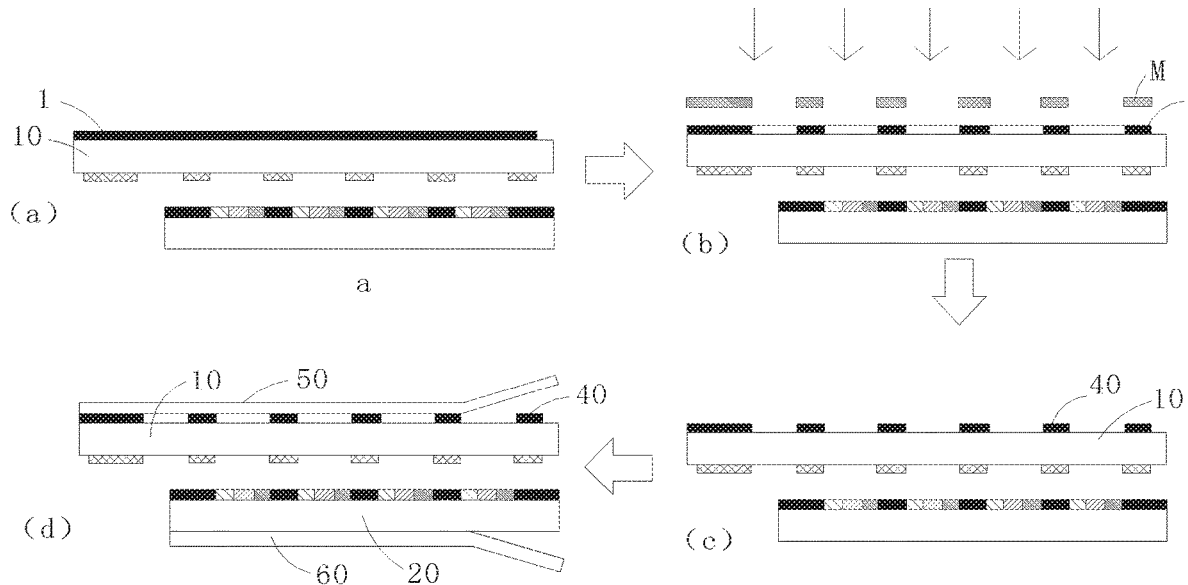
FIG. 4 is a diagrammatic view illustrating the procedural steps in the manufacturing process of the display panel according to an embodiment of the disclosure.

Please refer to FIG. 3 and FIG. 4, the manufacturing process for display panel according to an embodiment of the invention is now described as follows. The manufacturing process includes the steps of:

S01: providing a liquid crystal cell, which includes a first substrate, a second substrate, and liquid crystals filled therebetween;

S02: fabricating a shading film layer 1 on the surface of the first substrate 10 away from the second substrate 20. The shading film layer 1 can be formed by, for example, a deposition process.

S03: exposing the shading film layer 1 by a lithography mask M having a predetermined hollow pattern;

S04: etching off the exposed portion of the shading film layer 1 while leaving the unexposed portion, thereby forming a patterned shading array layer 40 aligning with the metal signal wires 100 on the first substrate 10;

S05: respectively adhering an upper polarizer 50 and a lower polarizer 60 to the outer surface of the shading film layer 1 and the outer surface of the second substrate 20.

The first substrate 10 is a TFT substrate and the second substrate 20 is a color filter substrate. The projection of the metal signal wires 100 on the second substrate 20 is located in the gap between adjacent color resistance units 200. The combinative projection of the shading array layer 40 and the black matrices 201 is located in the non-pixel area and completely covers the non-pixel area. The black matrices 201 are partially overlapped with the projection of the shading array layer 40 on the first substrate 10, so as to prohibit the user from seeing the lights leaked from the crevice between the black matrices 201 and the shading array layer 40 when the user is watching the displayed image in the widthwise direction of the display panel. Alternatively, the thickness of the portion of the black matrix 201 shaded by the shading array layer is smaller than the thickness of the rest of the black matrix 201. Because the metal signal wires 100 and the shading array layer 40 both can be used to block the optical crosstalk between the pixels, the thickness of the black matrix 201 can be set to be smaller than the thickness of the color resistance 200. Alternatively, the black matrix 201 can be omitted.

After the shading array layer 40 is made, the hollowed-out area of the shading array layer 40 may be filled with a transparent material such as an optical adhesive or an overcoat layer. This would enhance the bonding strength of the shading array layer 40 and allow the flat upper polarizer to adequately adhered to the surface.

In conclusion, the first substrate of the invention faces the viewer and the chip on film is bonded onto the inner side of the first substrate, thereby attaining a bezel-less display panel. By arranging a patterned shading array layer on the outer surface of the first substrate, the shading array layer forms a pattern corresponding to the metal signal wires on the inner surface of the first substrate. Thus, the metal signals wires can be shaded. When external lights come into the display panel, the incident light will be weakened or blocked by the shading array layer. So the intensity of lights reaching the metal signal wires is significantly suppressed and the reflectiveness of the metal signal wires is reduced.

The embodiment of the invention has been elaborated concretely by the above descriptions. It should be understood that an artisan skilled in the art is able to make modifications and alterations to the aforementioned embodiment without departing from the scope of the invention. These modifications and alterations should be deemed to be fallen within the scope of patent protection.

What is claimed is:

1. A display panel, comprising:
   a first substrate;
   a second substrate;
   a chip on film; and a shading array layer;
wherein the first substrate is opposite to and spaced from the second substrate, and the end of the first substrate extending beyond the second substrate forms a bonding end;
wherein the chip on film is bonded onto a surface of the bonding end facing the second substrate, and the first substrate is closer to a light output surface than the second substrate is; and
wherein an inner surface of the first substrate is provided with metal signal wires located in a non-pixel area, and the shading array layer is located in the non-pixel area and completely shades the metal signal wires,
wherein an inner surface of the second substrate is provided with color resistances formed in a pixel area and black matrices formed in the non-pixel area, and a combinative projection of the shading array layer and the black matrices on the second substrate is located in the non-pixel area and completely covers the non-pixel area;
wherein each black matrix fills in a gap between each adjacent color resistance;
wherein a thickness of a portion of the black matrices shaded by the shading array layer is smaller than a thickness of the rest of the black matrices.

2. The display panel according to claim 1, wherein a thickness of the black matrices is smaller than a thickness of the color resistances.

3. The display panel according to claim 1, wherein a hollowed-out area of the shading array layer is filled with a transparent material.

4. The display panel according to claim 1, wherein the shading array layer is photoresist.

5. A manufacturing method for a display panel, wherein the display panel comprises a first substrate, a second substrate, a chip on film, and a shading array layer, wherein the first substrate is opposite to and spaced from the second substrate, and the end of the first substrate extending beyond the second substrate forms a bonding end, and wherein the chip on film is bonded onto a surface of the bonding end facing the second substrate, and the first substrate is closer to a light output surface than the second substrate is, and wherein an inner surface of the first substrate is provided with metal signal wires located in a non-pixel area, and the shading array layer is located in the non-pixel area and completely shades the metal signal wires, wherein the manufacturing method comprising the steps of:
providing a liquid crystal cell, which comprises a first substrate, a second substrate, and liquid crystals filled therebetween;
fabricating a shading film layer on a surface of the first substrate away from the second substrate;
exposing the shading film layer by a lithography mask;
etching off an exposed portion of the shading film layer, thereby forming a patterned shading array layer aligning with the metal signal wires on the first substrate; and
respectively adhering an upper polarizer and a lower polarizer to an outer surface of the shading film layer and an outer surface of the second substrate,
wherein in the liquid crystal cell, an inner surface of the second substrate is provided with color resistances formed in a pixel area and black matrices formed in the non-pixel area, and a combinative projection of the shading array layer and the black matrices on the second substrate is located in the non-pixel area and completely covers the non-pixel area, and each black matrix fills in a gap between each adjacent color resistance;
wherein a thickness of a portion of the black matrices shaded by the shading array layer is smaller than a thickness of the rest of the black matrices.

6. The manufacturing method according to claim 5, wherein a thickness of the black matrices is smaller than a thickness of the color resistances.

7. A display device, comprising:
a backlight module; and
a display panel, wherein the display panel comprises:
a first substrate;
a second substrate;
a chip on film; and
a shading array layer;
wherein the first substrate is opposite to and spaced from the second substrate, and the end of the first substrate extending beyond the second substrate forms a bonding end;
wherein the chip on film is bonded onto a surface of the bonding end facing the second substrate, and the first substrate is closer to a light output surface than the second substrate is;
wherein an inner surface of the first substrate is provided with metal signal wires located in a non-pixel area, and the shading array layer is located in the non-pixel area and completely shades the metal signal wires; and
the backlight module is arranged at a side of the second substrate,
wherein an inner surface of the second substrate is provided with color resistances formed in a pixel area and black matrices formed in the non-pixel area, and a combinative projection of the shading array layer and the black matrices on the second substrate is located in the non-pixel area and completely covers the non-pixel area;
wherein each black matrix fills in a gap between each adjacent color resistance;
wherein a thickness of a portion of the black matrices shaded by the shading array layer is smaller than a thickness of the rest of the black matrices.

8. The display device according to claim 7, wherein a thickness of the black matrices is smaller than a thickness of the color resistances.

9. The display device according to claim 7, wherein the shading array layer is photoresist, and a hollowed-out area of the shading array layer is filled with a transparent material.

* * * * *